ial No. 213,127

United States Patent Office 3,276,955
Patented Oct. 4, 1966

3,276,955
BACTERIOSTATIC COMPOSITIONS
Robert E. Casely and Darwin R. Noel, Chicago, Ill., assignors to Armour and Company, Chicago, Ill., a corporation of Delaware
No Drawing. Filed July 30, 1962, Ser. No. 213,127
4 Claims. (Cl. 167—38.7)

This application is a continuation-in-part of our copending application Serial No. 741,470, filed June 12, 1958, now abandoned.

The present invention relates to bacteriostatic materials. More particularly, this invention relates to materials having retentive antibacterial and anti-odor-forming properties, and to methods for imparting these properties to materials.

Heretofore, materials such as textiles, paper, leather, and the like have been rendered bacteriostatic either by bringing about a chemical reaction between the molecules of the material and a germicidal agent, or by employing binders with a germicide to achieve retention by the material of the active agent. Materials generally are treated with these substances at some stage in their production, usually the finishing operation, and require considerable and specialized equipment to accomplish the desired end. Although in certain instances a high degree of bacterial growth inhibition is realized with conventional methods, the bacteriostatic agents employed may be undesirable in that they are either somewhat toxic in the material, irritating to the skin, non-odorless, ineffective in low concentrations, too expensive for practical use, difficult to apply without involving extra operations, or have an unfavorable effect on dyestuffs and tensile strength.

We have discovered bacteriostatic materials, and methods for producing them, which manifest none of these undesirable qualities. It is, therefore, the principal object of this invention to provide materials having highly effective antibacterial and anti-odor-forming properties, the materials, except for these properties, retaining substantially the same characteristics as untreated materials. It is another object of this invention to provide methods for imparting, easily and inexpensively, antibacterial and anti-odor-forming properties to such materials. Further objects and advantages of the invention will appear as the specification proceeds.

According to the present invention, materials are rendered bacteriostatic by contacting them with a detergent containing a synergistic composition of a halogenated bisphenol and a compound selected from the group consisting of polyhalo carbanilides and polyhalo salicylanilides. Materials such as fabrics and the like may be treated with the detergent in an ordinary laundering operation without the need of specialized equipment.

For the purposes of this invention any suitable halogenated bisphenol may be used as one of the ingredients. The halogenated bisphenols can be represented according to their chemical structure as follows:

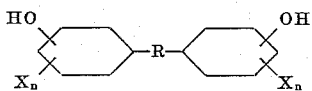

wherein X represents a halogen such as chlorine or bromine $n$ represents an integer of from 1 to 3, and R represents a divalent radical including alkylene radicals having 1 to 4 carbon atoms such as —$CH_2$—, —$CH_2CH_2$—, —$CH(CH_3)$—, —$C(CH_3)_2$—, —$CH_2CH_2CH_2$—, etc., and —S—. The preferred compounds are symmetrical in structural configuration. Specific examples of the halogenated bisphenols include 2,2'-dihydroxy-3,5,6,3',5',6'-hexachlorodiphenylmethane,
2,2'-dihydroxy-3,5,3',5'-tetrachlorodiphenylmethane,
2,2'-dihydroxy-4,5,4',5'-tetrachlorodiphenylmethane,
2,2'-dihydroxy-3,4,3',4'-tetrachlorodiphenylmethane,
2,2'-dihydroxy-5,5'-dibromodiphenylmethane,
2,2'-dihydroxy-3,5,3',5'-tetrachlorodiphenylsulfide, and
2,2'-dihydroxy-5,5'-dichlorodiphenysulfide.

Used in conjunction with the halogenated bisphenols in the present invention are polyhalo carbanilides selected from the group consisting of 3,4,4'-trichlorocarbanilide and its position isomer 3,3',4-trichlorocarbanilide, which can be represented by the following structural formula:

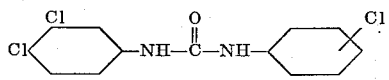

The polyhalo salicylanilides used in connection with the halogenated bisphenols of this invention may be any suitable salicylanilide composition characterized by the presence of halogen atoms in both of the aromatic rings. These compounds can be represented according to the general chemical structure as follows:

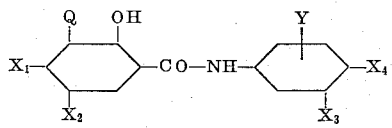

wherein Q represents a member selected from the group consisting of hydrogen, chlorine, bromine and iodine, $X_1$ and $X_2$ each represent a member selected from the group consisting of hydrogen, chlorine, bromine, iodine and $CH_3$, $X_3$ represents a member selected from the group consisting of hydrogen, chlorine, bromine and $CH_3$ and $X_4$ and Y each represent a member selected from the group consisting of hydrogen, chlorine and bromine, there being at least 2 halogen substituents in the X positions. Specific examples of compounds coming within the aforementioned general formula include 5-chlorosalicylic acid-3',4'-dichloroanilide, 5-chlorosalicylic acid-4-chloroanilide, 4,5-dichlorosalicylic acid-3',4'-dichloroanilide, 4,5-dichlorosalicylic acid-2',3',4'-trichloroanilide, 5-chlorosalicylic acid-2',3',4'-trichloroanilide, and 3,5-dichlorosalicylic acid-2',3'-4'-trichloroanilide. These compositions are produced, generally, by the reaction between a halogenated salicylic acid and a halo substituted anilide.

The germicidal activity of the halogenated bisphenols and the polyhalo carbanilides or the polyhalo salicylanilides, as illustrated above, are discussed in our co-pending applications Serial No. 537,059, filed September 27, 1955, now abandoned, and Serial No. 537,060, filed September 27, 1955, now abandoned.

Relatively small amounts of the halogenated bisphenol and either the polyhalo carbanilides or polyhalo salicylanilides are sufficient to impart antibacterial and anti-odor-forming properties to materials. Satisfactory results can be obtained when the combined weights of the two agents are from 0.05% to 5% of the total weight of the detergent. The objects of the invention may be achieved when the weight of the bisphenol is about 0.1% to 3% and the polyhalo carbanilide or polyhalo salicylanilide is about 3% to about 0.1% of the detergent weight. The preferred range is a weight concentration of about 0.25% to 1.75% of the bisphenol and about 1.75% to 0.25% of the carbanilides or salicylanilides. An excellent result is obtained with a detergent containing about 1% of each of the bisphenol and either the polyhalo carbanilide or the polyhalo salicylanilide. It will be understood that even concentrations below the ranges just set out will provide some degree of protection and substantially higher concentrations than those referred to will provide satisfactory results.

The invention contemplates the use of synthetic detergents of either the anionic or non-ionic-type. The anionic-type synthetic suitable for use in the invention may be described as those detergents having pronounced cleansing power and including in their molecular structure an alkyl radical containing from 6 to 18 carbon atoms and a sulfonic acid or sulfuric acid ester radical. Either the sodium or potassium salts of the anionic-type detergents can be used. The main types of detergents falling within this category are the alkyl aryl sulfonates, such as sodium or potassium dodecylbenzene sulfonate, sodium or potassium octadecylbenzene sulfonate, and sodium or potassium octylnaphthylene sulfonate; the alkyl sulfates, such as the sodium or potassium salts of dodecyl, hexadecyl, and octadecyl sulfates; the sulfonated fatty acid amides, such as the sodium or potassium salts of the oleic acid amide of methyl taurine; and the sulfonated monoglyceride, such as the monococonut oil fatty acid ester of 1,2-hydroxypropane-3-sodium sulfonate.

The non-ionic-type synthetic detergents suitable for use in the invention may be described as those detergents which do not ionize in solution but owe their water-solubility to unionized polar groups such as hydroxyl or ether linkages. The main types of detergents falling within this category are the polyoxyethylene ethers of the higher fatty alcohols and alkyl phenols; the polyethylene glycols of fatty acids; fatty alkylol amide condensation products; polymers of ethylene and propylene oxides; compounds formed by the addition of propylene oxide to ethylene diamine, followed by the addition of ethylene oxide; fatty acid ethylene oxide condensation products; condensation products of ethylene oxide and a fatty acid ester of a polyhydric alcohol or sugar; and the detergents prepared by heating together a higher fatty acid with a diethanolamine. Some examples of synthetic non-ionics suitable for the purposes of this invention are ethylene oxide-tall oil fatty acid reaction products; iso-octyl phenol-ethylene oxide reaction products; propylene oxide-ethylene oxide reaction products; and combinations of iso-octyl phenol-ethylene oxide with coconut oil fatty acid-ethylene oxide reaction products.

The halogenated bisphenols and the polyhalo carbanilides or the polyhalo salicylanilides may be added to the detergent by any suitable method which results in a uniform distribution of the additives throughout the entire mass. A highly satisfactory dispersion method of carrying out the addition step is described more fully in copending application Serial No. 263,302, filed December 26, 1951, now abandoned.

The bacteriostatic and odor-resistant materials of the present invention may be produced in ordinary use dilutions of the detergents containing the above-described synergistic compositions. A typical use dilution may be 0.2% of the detergent containing 5 parts per million of the active composition. It should be apparent, however, that it is possible to achieve the purposes of this invention with extremely wide and varied concentrations of the preferred detergents.

Materials treated in accordance with the teaching of this invention may be finished or unfinished products, and may be composed of natural or synthetic fibers, or both. The bacteriostatic and anti-odor-forming properties of the treated materials are retained for several days, after which time they can be readily restored, for example, in a typical laundering operation. In this manner materials may be rendered antibacterial and anti-odor-forming throughout their useful life.

Specific examples illustrating the invention are set out as follows:

EXAMPLE I

Cotton cloth sections were washed in 0.2% use dilution of a commercial detergent composed of approximately 14.5% nonionic detergent, 1½% sodium silicate, 6½% sodium pyrophosphate, 20% potassium pyrophosphate, 55% moisture, and containing the concentrations of germicides as set out below, for 10 minutes at 37° C., rinsed twice, dried and placed on the surface of agar plates previously seeded with the test organism. After an incubation period of 24 hours at 37° C., the zone of inhibition was measured. The results are given in Table I.

Table I

The control in Table I and in each of the tables of the examples to follow contained the detergent composition without the germicides.

Zone of inhibition in mm. produced by cloth washed in the above detergent:

|    |                              | M. pyogenes | B. ammoniagenes | E. coli |
|----|------------------------------|-------------|-----------------|---------|
| #1 | Control                      | 0           | 0               | 0       |
| #2 | 0.125% Bithionol+0.125% TCC  | 2           | 2               | 0       |
| #3 | 0.25% Bithionol              | 0           | 0               | 0       |
| #4 | 0.25% TCC                    | <1          | 1               | 0       |
| #5 | 0.25% Bithionol+0.25% TCC    | 4           | 3               | 0       |
| #6 | 0.25% Anobial                | 4           | 3               | 0       |
| #7 | 0.125% Anobial+0.125% Bithionol | 1        | 1               | 0       |

Legend:

MATERIALS USED

TCC—3,4,4'-trichlorocarbanilide
Anobial—5-chlorosalicylic acid-3',4'-dichloroanilide

EXAMPLE II

Cloth patches 1½ inches square were washed in 0.2% use dilution as in Example I, rinsed twice, dried and seeded with 0.1 ml. of 1–100 dilution of a 24-hour broth culture of $M.$ $pyogenes$ var. $aureus$. After a 30 minute exposure period, the patches were placed in a 99 ml. dilution blank and shaken. One ml. of this dilution water was then withdrawn and plated using standard plate count agar. The plates were incubated 48 hours at 37° C. after which the numbers of survivors were counted. The results are given in Table II.

Table II

Numbers of surviving bacteria after 30 minutes exposure on cotton cloth patches washed in the 0.2% use dilution. Counts are per ml. of dilution water.

TEST I

| Patch | Control | 0.125% Bith, 0.125% TCC | 0.25% Bith | 0.25% TCC | 0.25% Bith, 0.25% TCC | 0.125% Ano, 0.125% Bith |
|-------|---------|-------------------------|------------|-----------|-----------------------|-------------------------|
| 1     | 1,100   | 12                      | 350        | 1,200     | 4                     | 0                       |
| 2     | 950     | 0                       | 450        | 1,200     | 3                     | 3                       |
| 3     | 1,200   | 110                     | 400        | 1,000     | 0                     | 0                       |
| 4     | 1,400   | 52                      | 325        | 900       | 16                    | 11                      |
| 5     | 850     | 24                      | 800        | 1,500     | 22                    | 5                       |
| 6     | 1,600   | 16                      | 650        | 1,100     | 0                     | 0                       |
| 7     | 900     | 85                      | 880        | 1,250     | 0                     | 2                       |
| 8     | 1,300   | 6                       | 600        | 1,400     | 5                     | 14                      |
| 9     | 650     | 0                       | 550        | 1,800     | 3                     | 2                       |
| 10    | 1,500   | 15                      | 750        | 1,600     | 0                     | 0                       |

Legend:

MATERIALS USED

TCC—3,4,4'-trichlorocarbanilide
Ano.—Anobial-5-chlorosalicylic acid-3,4'-dichloroanilide
Bith.—Bithionol

EXAMPLE III

Cloth patches 1½ inches square were immersed in a gelatin solution containing a heavy seeding of $M.$ $pyogenes$ var. $aureus$. After a contact period of 10 minutes, the patches were removed and given a simulated wash at 37° C. in 100 ml. of a 0.2% use dilution as in Example I. The cloth patches were given two rinses in 50 ml. of water, dried for one hour at room temperature and the cloth plated directly onto nutrient agar. The results are given in Table III.

Table III

Numbers of bacteria on seeded cloth patches washed for 10 minutes in the 0.2% use dilution at 37° C. rinsed twice and dried for one hour.

| Patch | Control | 0.125% Bith, 0.125% TCC | 0.25% Bith | 0.25% TCC | 0.25% Bith, 0.25% TCC | 0.125% Ano, 0.125% Bith |
|---|---|---|---|---|---|---|
| 1 | 1500 | 120 | 850 | 1500 | 90 | 0 |
| 2 | 1000 | 220 | 400 | 790 | 23 | 4 |
| 3 | 3000 | 225 | 340 | 920 | 120 | 14 |
| 4 | 6000 | 90 | 540 | 1200 | 85 | 5 |
| 5 | 5500 | 125 | 620 | 1400 | 62 | 3 |
| 6 | 1800 | 108 | 420 | 950 | 35 | 7 |
| 7 | 2200 | 75 | 920 | 1700 | 42 | 3 |
| 8 | 4000 | 60 | 1100 | 1500 | 51 | 0 |
| 9 | 3500 | 85 | 880 | 1350 | 77 | 2 |
| 10 | 5000 | 110 | 1200 | 1000 | 28 | 0 |

Legend:

MATERIALS USED

TCC—3,4,4'-trichlorocarbanilide
Ano.—Anobial-5-chlorosalicylic acid-3,4'-dichloroanilide
Bith.—Bithionol While this invention has been described and exemplified in terms of its preferred embodiments, those skilled in the art will appreciate that variations can be made without departing from the spirit and scope of the invention.

We claim:

1. A product having bacteriostatic properties comprising material treated with a germicidal composition of a detergent containing a synergistic combination having a combined weight of from about 0.25% to about 0.50% of the weight of said detergent of equal parts by weight of 2,2'-dihydroxy-3,5,3',5',-tetrachlorodiphenylsulfide and a compound selected from the group consisting of 3,4,4'-trichlorocarbanilide and 5-chlorosalicylic acid-3',4'-dichloroanilide.

2. A product having bacteriostatic properties as set forth in claim 1 wherein the detergent is a nonionic synthetic detergent.

3. A process for imparting bacteriostatic properties to material comprising the step of contacting the material with a germicidal composition of a detergent containing a synergistic combination having a combined weight of from about 0.25% to about 0.50% of the total weight of said detergent of equal parts by weight of 2,2'-dihydroxy-3,5,3',5'-tetrachlorodiphenylsulfide and a compound selected from the group consisting of 3,4,4'-trichlorocarbanilide and 5-chlorosalicylic acid-3',4'-dichloroanilide.

4. A process as set forth in claim 3 wherein the detergent is a non-ionic synthetic detergent.

References Cited by the Examiner

UNITED STATES PATENTS 2,818,390   12/1957   Beaver et al. _____ 167—31
3,057,920   10/1962   Schramm _____ 167—31

FOREIGN PATENTS 1,130,335   2/1957   France.
745,607   2/1956   Great Britain.

OTHER REFERENCES

Berk, Industrial and Eng. Chem., vol. 40, pp. 262–267, January–June 1948.

Hopley et al., Sindar Corp. Tech. Bull. D–2 G–4 (Dichlorophene), page 10, July 1956.

Lewis, Perf. and Ess. Oil Rev., pp. 298–302, September 1954.

JULIAN S. LEVITT, *Primary Examiner.*

JEROME D. GOLDBERG, *Assistant Examiner.*